(12) United States Patent
Matsuo et al.

(10) Patent No.: US 6,697,503 B2
(45) Date of Patent: Feb. 24, 2004

(54) DEVICE AND METHOD FOR FACE IMAGE EXTRACTION, AND RECORDING MEDIUM HAVING RECORDED PROGRAM FOR THE METHOD

(75) Inventors: Hideaki Matsuo, Fukuoka (JP); Kazuyuki Imagawa, Fukuoka (JP); Yuji Takata, Fukuoka (JP); Naruatsu Baba, Izuka (JP); Toshiaki Ejima, Kitakyushu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 605 days.

(21) Appl. No.: 09/725,751

(22) Filed: Nov. 30, 2000

(65) Prior Publication Data

US 2001/0002932 A1 Jun. 7, 2001

(30) Foreign Application Priority Data

Dec. 1, 1999 (JP) ............................................ 11-342025

(51) Int. Cl.⁷ ................................................ G06K 9/00
(52) U.S. Cl. ...................................... 382/118; 382/103
(58) Field of Search ........................ 382/115–118, 100, 382/103; 340/5.52, 5.53, 5.82, 5.83; 235/380, 382, 382.5; 902/3–6; 351/204

(56) References Cited

U.S. PATENT DOCUMENTS 5,828,769 A * 10/1998 Burns .......................... 382/118

FOREIGN PATENT DOCUMENTS

JP        9-73544       3/1997
JP        10-307923     11/1998

* cited by examiner

Primary Examiner—Samir Ahmed
Assistant Examiner—Vikkram Bali
(74) Attorney, Agent, or Firm—Wenderoth, Lind & Ponack, L.L.P.

(57) ABSTRACT

In a broadly-applicable face image extraction device and method for defining a face by position and size in target images varied in type for face image extraction at high speed, an edge extraction part 1 extracts an edge part from a target image and generates an edge image. A template storage part 2 previously stores a template composed of a plurality of concentric shapes varied in size. A voting result storage part 3 has voting storage regions for each size of the concentric shapes of the template so as to store the result obtained by voting processing carried out by a voting part 4. The voting part 4 carries out the voting processing utilizing the template at each pixel in the edge image, and stores the result obtained thereby in the corresponding voting storage region. After the voting processing, an analysis part 5 performs cluster evaluation based on the voting results stored in the voting storage regions, and then defines the face in the target image by position and size.

19 Claims, 8 Drawing Sheets

DEVICE AND METHOD FOR FACE IMAGE EXTRACTION, AND RECORDING MEDIUM HAVING RECORDED PROGRAM FOR THE METHOD

BACKGROUND OF THE INVENTION

1. Field of the Invention

The present invention relates to a device and a method for face image extraction, and a recording medium having recorded a program for carrying out the method. More specifically, in image processing, such device and method are used to extract, at high speed, a face region from a target image utilizing a template to define position and size thereof.

2. Description of the Background Art

As everyone acknowledges, a human face often mirrors his/her thinking and feeling, and thus is considered a significant factor. In image processing especially where handling human images, if such human face can be automatically detected and processed to reveal its position and size in a target image, such system comes in useful. Here, the target image includes still pictures and moving pictures, and a person taken therein may be both real and artificial created by computer graphics, for example. This is the reason for the recent attempt in image processing to extract a face region out of any target image on such system.

Conventional technologies of such face image extraction have been disclosed in Japanese Patent Laid-Open Publication No. 9-73544 (97-73544) (hereinafter, first document) and No. 10-307923 (98-307923) (hereinafter, second document), for example.

The technology disclosed in the first document is of finding an approximation of face region by an ellipse. Therein, the ellipse is defined by five parameters including center coordinates (x, y), a radius r, a ratio b between major and minor axes, and an angle θ between the major axis and an x axis. These parameters are changed as appropriate to be optimal in value for face image extraction.

In the second document, the technology is of successively finding face parts (e.g., eyes, nose, mouth).

In the first document, however, approximation requires repeated calculation to change those parameters (especially the angle θ takes time). In consideration of a face image hardly staying the same, real-time approximation is hopeless with the processing capability of existing personal computers, so thus is real-time face image extraction processing. Also in this technology, there has no concern given for a possibility that one image may include several human faces, and thus applicability of this technology is considered narrow.

In the second document, the technology is not available unless otherwise a face region has been defined by position in an image. Therefore, this is applicable only to a specific image, resulting in narrow applicability.

SUMMARY OF THE INVENTION

Therefore, an object of the present invention is to provide a broadly-applicable device and method for defining a face by position and size in images varied in type for face image extraction at high speed, and a recording medium having recorded a program for carrying out the method.

The present invention has the following features to attain the object above.

A first aspect of the present invention is directed to a face image extraction device for defining a face in a target image by position and size for extraction, comprising:

an edge extraction part for extracting an edge part (pixels outlining a person or face) from the target image, and generating an image having only the edge part (hereinafter, edge image);

a template storage part for storing a template composed of a plurality of predetermined concentric shapes equal in shape but varied in size;

a voting result storage part for storing, in a interrelating manner, voting values and coordinates of pixels on the edge image for every size of the concentric shapes of the template;

a voting part for increasing or decreasing the voting values of every pixel, specified by the coordinates, outlining each of the concentric shapes every time a center point of the template moves on the pixels in the edge part; and an analysis part for defining the face in the target image by position and size based on the voting values stored in the voting result storage part.

As described above, in the first aspect, the face position can be detected at high speed only with light-loaded voting processing and evaluation of voting values. Further, as is utilizing a template composed of concentric shapes varied in size, approximation can be done in a practical manner by comparing, in size, an edge part presumed to include a face region with the template. Accordingly, size of the face can be detected also at high speed. As such, in the face image extraction device of the present invention, processing load can be considerably reduced, thereby achieving almost real-time face region extraction even with the processing capabilities available for the existing personal computers. Further, in the first aspect, a face region does not have to be defined where and how many in a target image prior to extraction, and thus a face can be detected no matter what size and type the target image is. Accordingly, applicability of the device considered quite wide.

Herein, preferably, the predetermined concentric shape is a circle, an ellipse, or a polygon. In such case, the circle may improve the voting result in accuracy as is being constant in distance from a center point to each pixel outlining the circle.

Preferably, the edge extraction part extracts the edge part from the target image by using a filter for a high frequency component.

Therefore, any high frequency component can be obtained by using a filter for the target image, whereby position and size of a face can be preferably detected in a case where the target image is a still picture.

Preferably, when the target image is structured by a plurality of successive images, the edge extraction part extracts the edge part by comparing a current image with another image temporally before, and with after to calculate a difference therebetween, respectively, for every image structuring the target image.

In this manner, a current target image is compared with another temporally before and then with after to calculate a difference therebetween, respectively. Accordingly, position and size of a face can be preferably detected in a case where the target image is a series of moving pictures. Further, with the help of a template for detection, a face region can be stably extracted at high-speed even if facial expression changes to a greater extent at zoom-in or close-up, for example.

Also preferably, the edge extraction part detects, with respect to pixels extracted in every predetermined box, one pixel located far-left end or far-right end in the box on a scanning line basis, and regards only the pixels detected thereby as the edge part.

In this manner, any part differed in texture within contour is prevented from being extracted as the edge part. Therefore, the extraction processing can be done, at high speed, with respect to the face region.

Also preferably, the analysis part performs clustering with respect to the voting values stored in each of the voting result storage parts, and narrows down position and size of the face in the target image.

Therefore, even in the case that a target image includes several faces, the face region can be extracted by clustering the voting results (each voting value) and then correctly evaluating correlation thereamong.

Also preferably, the face image extraction device further comprises an image editing part for editing the target image in a predetermined manner by distinguishing a face region defined by position and size in the analysis part from the rest in the target image.

As such, by editing the target image while distinguishing a face region defined by position and size from the rest, only a desired part, i.e., a face, can be emphasized and thus become conspicuous in the target image As an example, the target image excluding the face region may be solidly shaded, leading to eye-catching effects.

Still preferably, the face image extraction device further comprises an image editing part for replacing an image of the face region defined by position and size by the analysis part with another.

As such, the image of the face region can be replaced with another. In this manner, the face can be intentionally concealed. This works effective, for example, when image-monitoring a person who is suffering dementia. In such case, by replacing the image of a face with another, privacy can be protected, and a face area can be defined for monitoring This works also good when replacing images of a person's movement with other type of character's.

A second aspect of the present invention is directed to a face image extraction method for defining a face in a target image by position and size for extraction, comprising:

an extraction step of extracting an edge part (pixels outlining a person or face) from the target image, and generating an image having only the edge part (hereinafter, edge image);

a first storage step of storing a template composed of a plurality of predetermined concentric shapes equal in shape but varied in size;

a second storage step of storing, in a interrelating manner, voting values and coordinates of pixels on the edge image for every size of the concentric shapes of the template;

a voting step of increasing or decreasing the voting values of every pixel, specified by the coordinates, outlining each of the concentric shapes every time a center point of the template moves on the pixels in the edge part; and an analysis step of defining, after the voting step, the face in the target image by position and size based on the voting values.

As described above, in the second aspect, the face position can be detected at high speed only with light-loaded voting processing and evaluation of voting values. Further, as is utilizing a template composed of concentric shapes varied in size, approximation can be done in a practical manner by comparing, in size, an edge part presumed to include a face region with the template. Accordingly, size of the face can be detected also at high speed. As such, in the face image extraction device of the present invention, processing load can be considerably reduced, thereby achieving almost real-time face region extraction even with the processing capabilities available for the existing personal computers. Further, in the second aspect, a face region does not have to be defined where and how many in a target image prior to extraction, and thus a face can be detected no matter what size and type the target image is. Accordingly, applicability of the device considered quite wide.

Herein, preferably, the predetermined concentric shape is a circle, an ellipse, or a polygon.

In such case, the circle may improve the voting result in accuracy as is being constant in distance from a center point to each pixel outlining the circle.

Also preferably, in the extraction step, the edge part is extracted from the target image by using a filter for a high frequency component.

Accordingly, a high frequency component is extracted from the target image by using a filter. Therefore, position and size of a face can be preferably detected in a case where the target image is a still picture.

Also preferably, when the target image is structured by a plurality of successive images, the edge part is extracted by comparing a current image with another image temporally before, and with after to calculate a difference therebetween, respectively, for every image structuring the target image.

In this manner, a current target image is compared with another temporally before and then with after to calculate a difference therebetween, respectively. Accordingly, position and size of a face can be preferably detected in a case where the target image is a series of moving pictures. Further, with the help of a template for detection, a face region can be stably extracted at high-speed even if facial expression changes to a greater extent at zoom-in or close-up, for example.

Also preferably, in the extraction step, with respect to pixels extracted in every predetermined box, one pixel located far-left end or far-right end in the box is detected on a scanning line basis, and only the pixels detected thereby is regarded as the edge part.

As such, any part differed in texture within contour is prevented from being extracted as the edge part. Therefore, the extraction processing can be done, at high speed, with respect to the face region.

Still preferably, in the analysis step, clustering is performed with respect to the voting values stored in each of the voting result storage parts, and position and size of the face is narrowed down in the target image.

As such, even in the case that a target image includes several faces, the face region can be extracted by clustering the voting results (each voting value) and then correctly evaluating correlation thereamong.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
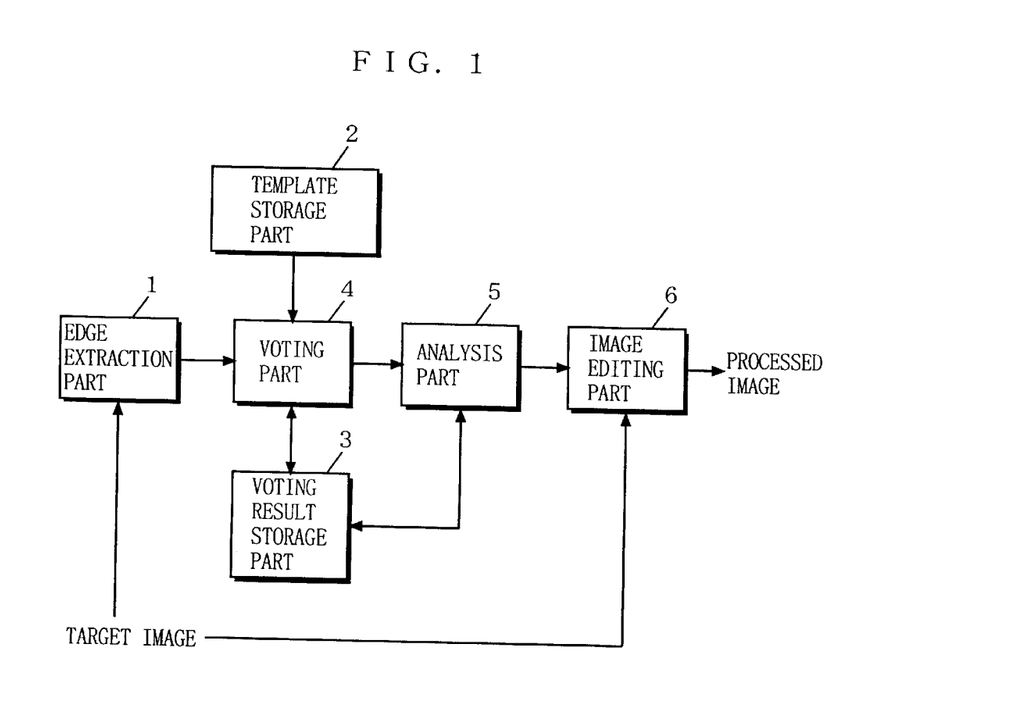
FIG. 1 is a block diagram showing the structure of a face image extraction device according to one embodiment of the present invention.

FIG. 1 is a block diagram showing the structure of a face image extraction device according to an embodiment of the present invention. In FIG. 1, the face image extraction device of the embodiment includes an edge extraction part 1, a template storage part 2, a voting result storage part 3, a voting part 4, an analysis part 5, and an image editing part 6.

Referring to the accompanying drawings, described below is the operation of each component above and a method for face image extraction.

The edge extraction part 1 receives an image for face image extraction (hereinafter, target image), and extracts an edge part therefrom to generate another image having only the edge part (hereinafter, edge image). Here, the edge part is a part (pixels) representing contours of human body or face, for example, where high in frequency. The target image may be both still and moving, and depending on which, a technique applied for edge part extraction differs.

Figure 2A:
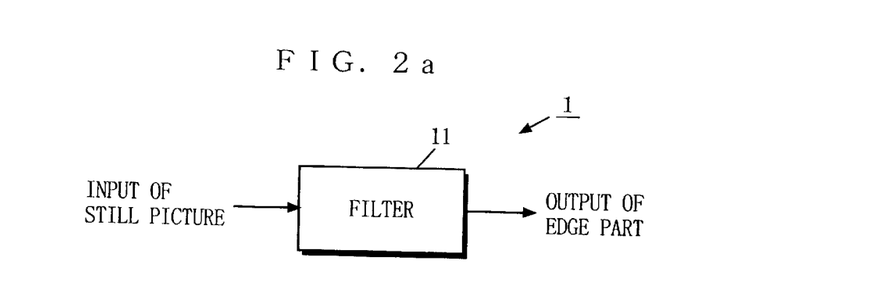
FIGS. 2a and 2b are diagrams each showing an exemplary structure of an edge extraction part 1.

For a still picture, as shown in FIG. 2a, the edge extraction part 1 is implemented by a filter 11 which takes out only a high frequency component, thereby simplifying edge part extraction process. The preferable type of the filter 11 is a Sobel.

Figure 2B:
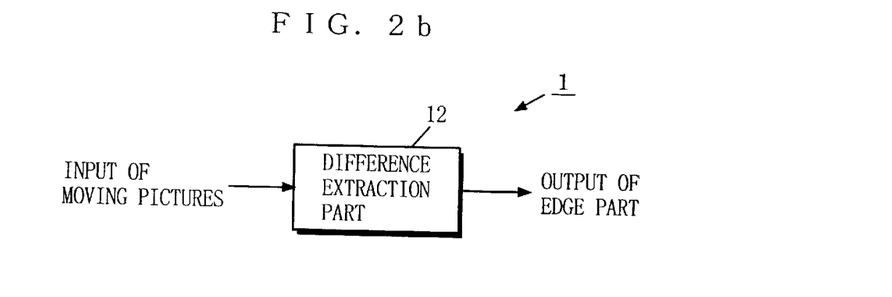

For moving pictures, as shown in FIG. 2b, the edge extraction part 1 is implemented by a difference extraction part 12. Specifically, the difference extraction part 12 compares a targeted moving picture with another located temporally before and then with after to calculate a difference therebetween (data difference on pixel basis), respectively. Thereafter, any part found large in such detected difference (where motion in images is active) is extracted as an edge part.

Figure 3A:
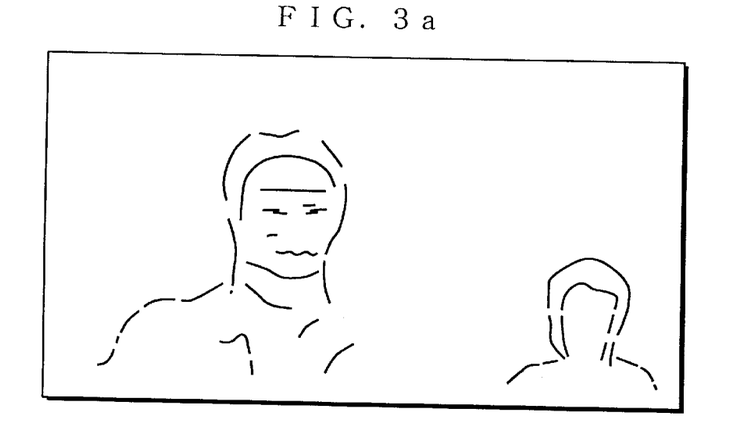
FIGS. 3a to 3c are diagrams each showing an exemplary edge image extracted by the edge extraction part 1.

Here, with the above techniques, a part(s) differed in texture within contours is extracted also as the edge part. FIG. 3a shows an exemplary edge image including such unwanted extracted parts. Although this causes no problem for the face image extraction device of the present invention, the following technique is preferable if processing therein is desired to be faster.

Figure 3B:
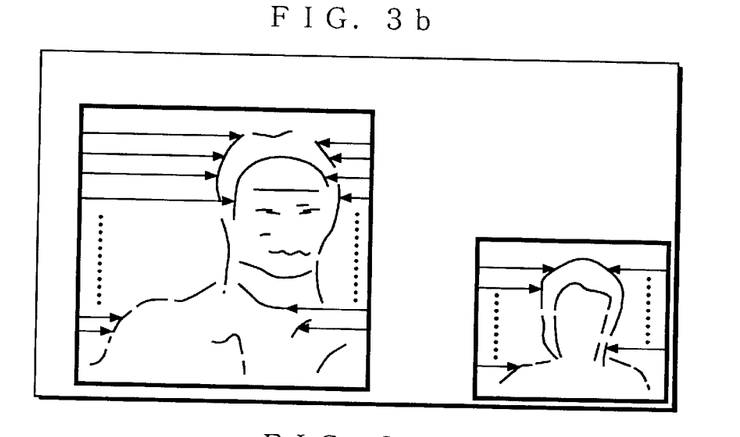
Figure 3C:
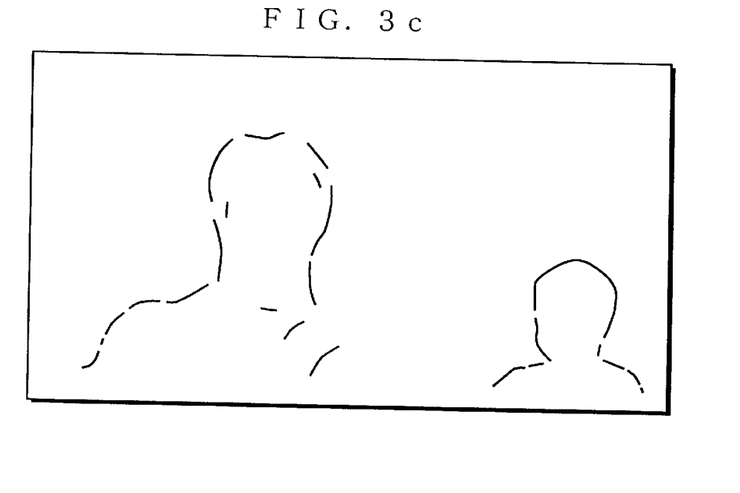

First, in such edge image as shown in FIG. 3a, any area having edge part rather concentrated is enclosed in a box (FIG. 3b). The image in the box is then subjected to bi-directional scanning on scanning line basis (FIG. 3b), and any outline formed by pixels each detected first thereby is determined as being the edge part in the target image (FIG. 3c). In this manner, any part differed in texture within contour is prevented from being extracted. Any constituent for this processing may be provided subsequent to the filter 11 or the difference extraction part 12.

The template storage part 2 previously stores data about a template composed of a plurality of concentric shapes, which are equal in shape but varied in size. Here, although the concentric shape may be any such as circle, ellipse, regular polygon, or polygon, but most preferable is circle. This is because the distance from a center point to an outline of the shape. i.e., to each pixel outlining the circle, is always constant, thereby improving the later-described voting result in accuracy.

Figure 4A:
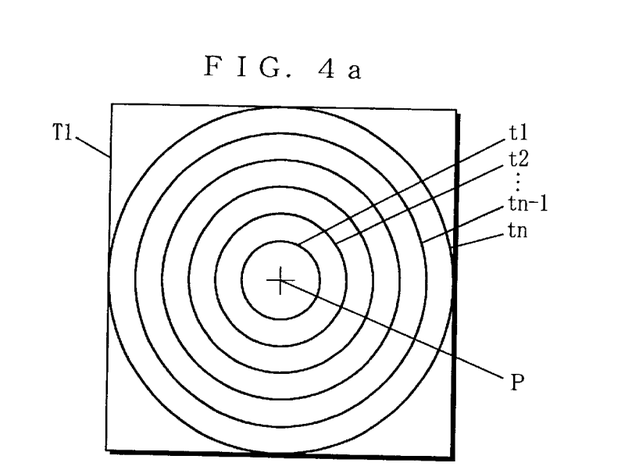
FIGS. 4a to 4c are diagrams each showing an exemplary template stored in a template storage part 2.
Figure 4B:
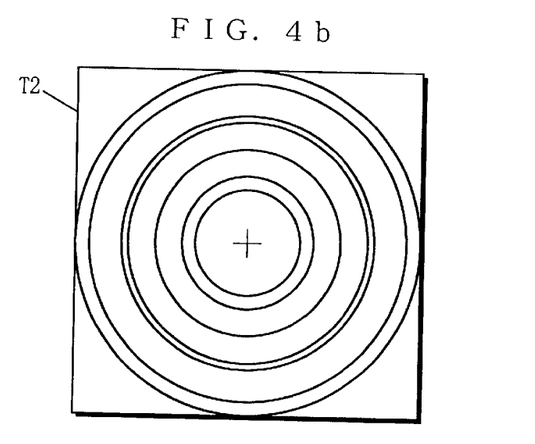
Figure 4C:
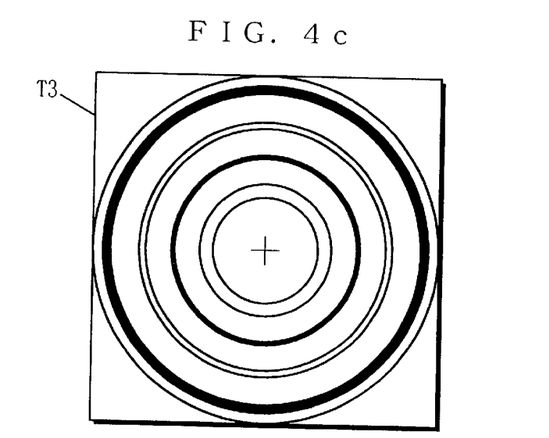

Here, as shown in FIGS. 4a to 4c, a template described in this embodiment is presumed to be composed of concentric circles t1 to tn (where n is an arbitrary integer) each differed in radius from a center point P. As for those circles t1 to tn, the difference in radius may be uniform as is a template T1 of FIG. 4a or irregular as is a template T2 of FIG. 4b. Further, those circles of t1 to tn may be outlined by one-dot line (correspond to a pixel in a target image) as is the template T2 of FIG. 4b, or as a template T3 of FIG. 4c, some or all of those may be outlined by two-dot or thicker line (i.e., annular ring shape). Hereinafter, a term "circle" means both circle and annular ring.

The circles t1 to tn are stored in the template storage part 2 as one template, but practically, handled as each independent. Therefore, for each of the circles t1 to tn, pixel data is stored in the template storage part 2 in the form of table, for example.

The voting result storage part 3 has regions each for the shapes of the template stored in the template storage part 2, in this example, circles t1 to tn. The regions (hereinafter, referred to as voting storage regions) store a result obtained by voting processing carried out by the voting part 4, which will be described later. Herein, the number of voting storage regions provided in the voting result storage part 3 is equal to that of circles, in this example, n. Note herein that, each voting storage region is of the same size as a target image.

Figure 5:
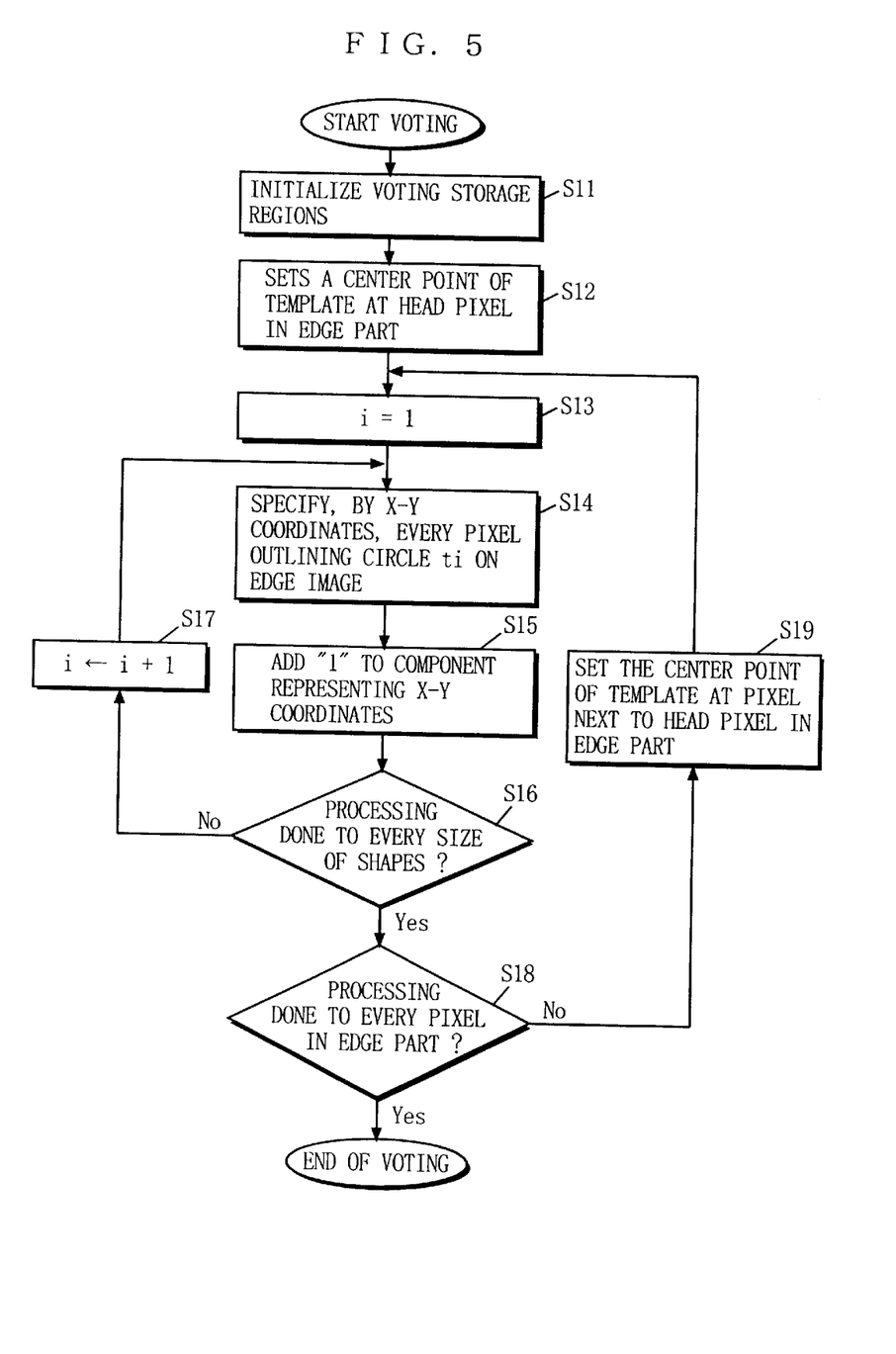
FIG. 5 is a flowchart showing the procedure of voting processing carried out by a voting part 4.

As for the edge image generated by the edge extraction part 1, the voting part 4 carries out the voting processing utilizing the template stored in the template storage part 2. FIG. 5 is a flowchart showing the procedure of the voting processing.

Referring to FIG. 5, the voting part 4 first accesses the voting result storage part 3, and initializes, to 0, components (voting values) representing x-y coordinates in each voting storage region (step S11). Thereafter, the voting part 4 sets the center point P of the template at the head of pixels in the edge part on the edge image (step S12). To find the head of pixels, the edge image is sequentially scanned, vertically or laterally, from the upper left. The position of pixel found first in the edge part may be regarded as the head.

The voting part 4 then initializes, to "1", a counter i indicates which of the shapes of the template (in this example, circles t1 to tn) (step S13). When the counter i indicates 1, for example, the voting part 4 uses the circle t1 and specifies every component outlining the circle t1 on the edge image by x-y coordinates (step S14). The voting part 4 then adds, i.e., votes, "1" to each of the components specified by the x-y coordinates in the voting storage region provided for the circle t1 in the voting result storage part 3. This is the voting processing.

Thereafter, the voting part 4 increments the counter i, i=2 (step S17). Since the counter i is now indicating the circle t2, the voting part 4 then specifies every component outlining the circle t2 by x-y coordinates (step S14). The voting part 4 then adds "1" again to each of the components specified by the x-y coordinates in the voting storage region this time provided for the circle t2 in the voting result storage part 3 (step S15).

As for the circles t3 to tn, the voting part 4 repeats the voting processing in steps S14 and S15 in the same manner as above while incrementing the counter i until i becomes n (steps S16, S17). As such, the voting storage regions provided each for the circles t1 to tn store the voting result obtained through the voting processing carried out at the head pixel in the edge part.

Thereafter, the voting part 4 sets the center point P of the template at a pixel next to the head pixel, and then repeats the processing in steps S13 to S17. This is done for every pixel, a pixel at a time, in the edge part on the edge image (steps S18, S19). In short, the center point P of the template never misses a single pixel in the edge part for the voting processing.

Figure 6:
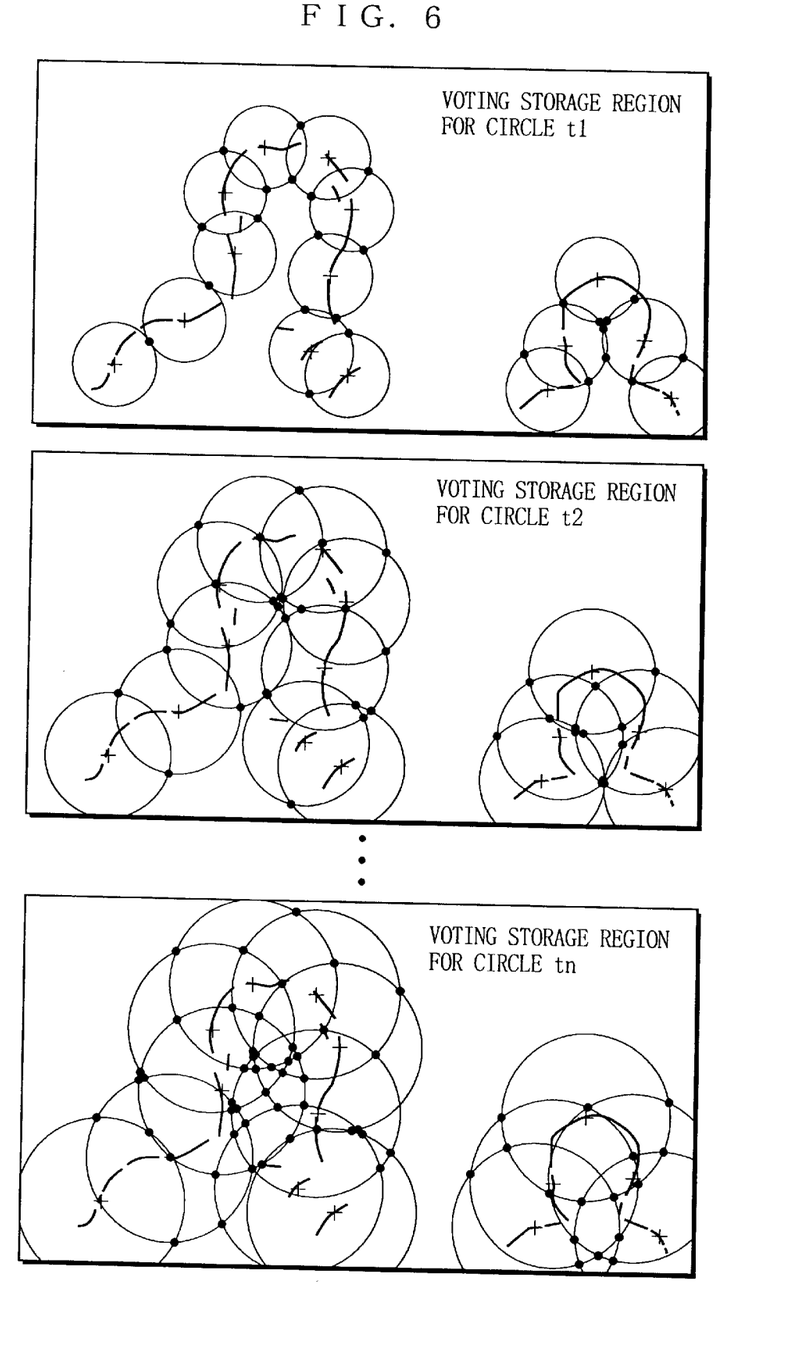
FIG. 6 is a diagram in assistance of explaining the concept of voting values stored, through voting processing, in voting storage regions provided in a voting result storage part 3.

As an example, by subjecting the above-described voting processing to such edge image as shown in FIG. 3c, n voting storage regions provided in the voting result storage 3 store such voting values as shown in FIG. 6. Here, presumably, the edge image shown in FIG. 3c is subjected to the above voting processing. For the sake of simplicity, FIG. 6 shows a case where the voting processing is carried out only at a specific pixel in the edge part. In each of the voting storage regions of FIG. 6, a circle is outlined by the components representing x-y coordinates having the voting value of "1". Here, since the voting value is accumulated as described in the foregoing, a part where the circles in FIG. 6 are crossing (indicated by a dot) has the larger voting value.

Accordingly, if the above-described voting processing is done to pixels being an edge part representing contours of a face approximated by a circle or an ellipse, the voting value is found larger in the vicinity of a center point thereof. It means that any part found larger in voting value is highly-possible to be the center of the face. Such phenomenon of the voting value concentrating at a specific part becomes noticeable when the concentric shape is a circle having a radius equal to or almost equal to a minimum width of the edge part. In consideration thereof, by determining in which voting storage region such phenomenon is conspicuously observed, the face can be specified by size. This sounds similar to generalized Hough transformation. However, the face image extraction method of the present invention is absolutely different therefrom in a respect that a face region can be specified, simultaneously, by position and size. This is implemented by using a template composed of concentric shapes varied in size.

Here, in the voting processing, the components representing x-y coordinates in each voting storage region may be initialized to a predetermined maximum value in step S11, and then the voting part 4 may subtract "1" from each applicable component in step S15. If this is the case, any part found smaller in voting value is highly-possible to be the center of the face, and by determining in which voting storage region such phenomenon is conspicuously observed, the face can be specified by size.

Moreover, in step S15, the value adding to or subtracting from the voting value is not restricted to "1", and may be arbitrarily determined.

Described next is a technique for specifying a face region in a target image according to the voting results stored in the voting result storage part 3.

Figure 7:
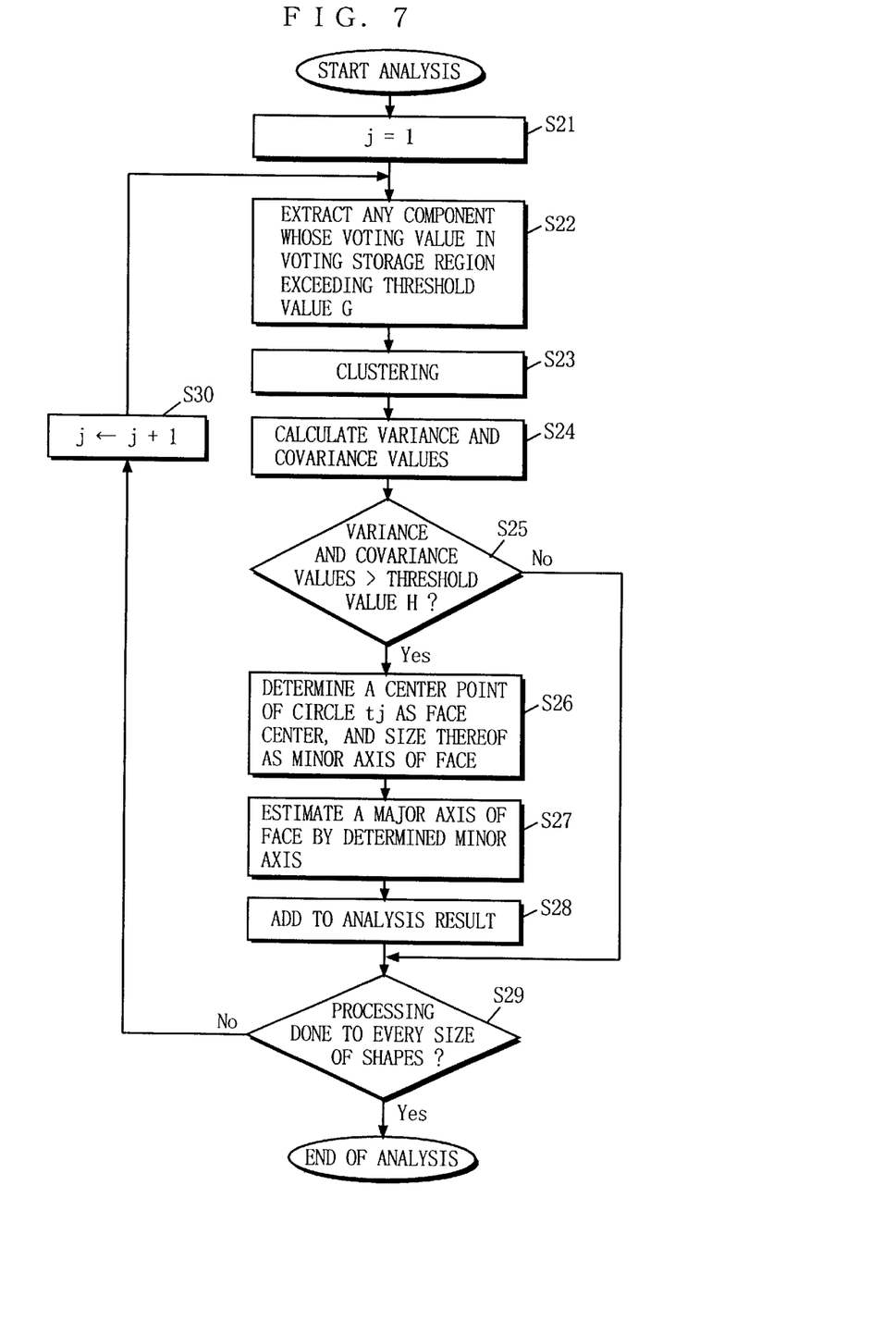
FIG. 7 is a flowchart showing the procedure of analysis processing carried out by an analysis part 5.

Once the voting part 4 completed its voting processing, the analysis part 5 refers to the voting results stored in the voting result storage part 3 for cluster evaluation, and then specifies a face in the target image by position and size. FIG. 7 is a flowchart showing the procedure of analysis processing carried out by the analysis part 5.

Referring to FIG. 7, the analysis part 5 first sets a counter j, to "1", whose value indicates which of the shapes of the template (in this example, circles t1 to tn) (step S21). When the counter j indicates 1, for example, the analysis part 5 refers to the voting storage region corresponding to the circle t1 for the voting result stored therein. The analysis part 5 then extracts any component whose voting value is exceeding a predetermined value of G (e.g., 200) (step S22). This threshold value G can be arbitrarily determined based on definition of the target image and a desired accuracy for face image extraction. The analysis part 5 performs clustering only for the extracted component(s) (step S23), and as for each clustered region, calculates variance and covariance values (step S24). In order to determine similarlity among clustered regions, any of Euclidean squared distance, generalized Euclidean squared distance, Maharanobis distance, or Minkowski distance may be applied. Further, to form clusters, any of SLINK (single linkage clustering method), CLINK (complete linkage clustering method) or UPGMA (unweighted pair-group method using arithmetic averages) may be applied.

The analysis part 5 then compares the variance and covariance values calculated for each clustered region with a predetermined threshold value of H (step S25). If those values are found smaller than the threshold value H in step S25, the analysis part 5 regards a center point in the face region as a center point of the face. Assuming that the counter j indicates "1", the size (diameter) of the circle t1 is determined as being a minor axis in length (step S26), and a length obtained by adding a constant (empirically determined) to the minor axis is as a major axis of the face (step S27). The analysis part 5 stores thus determined center point, and minor and major axes as the analysis results (step S28). On the other hand, if the variance and covariance values are found equal to or larger than the threshold value H, the analysis part 5 determines the center point in the region is not a center point of the face, and then the procedure moves to the next processing.

Thereafter, the analysis part 5 increments the counter j, j=2 (step S30). Since the counter j is now indicating the circle t2, the analysis part 5 then refers to the voting result stored in the voting storage region corresponding to the circle t2, and then extracts any component whose voting value is exceeding the threshold value G (step S22). The analysis part 5 performs clustering only for the extracted component(s) (step S23), and as for each clustered region, calculates variance and covariance values (step S24).

The analysis part 5 then compares the variance and covariance values calculated for each clustered region with a predetermined threshold value of H (step S25). If those values are found smaller than the threshold value H in step S25, the analysis part 5 regards a center point in the face region as a center point of the face. Assuming that the counter j indicates "1", the size of the circle t2 is determined as being a minor axis in length (step S26), and a length obtained by adding a constant (empirically determined) to the minor axis is as a major axis of the face (step S27). The analysis part 5 additionally stores thus determined center point, and minor and major axes as the analysis results (step S28). On the other hand, if the variance and covariance values are found equal to or larger than the threshold value H, the analysis part 5 determines the center point in the region is not a center point of the face, and then the procedure moves to the next processing.

As for the circles t3 to tn, the analysis part 5 repeats the analysis processing in steps S22 to S28 in the same manner as above while incrementing the counter j until j becomes n (steps S29, S30). As such, stored are the analysis results obtained through the analysis processing carried out for face image extraction for the voting storage regions provided each for the circles t1 to tn.

The analysis results are then outputted to the image editing part 6.

Figure 8A:
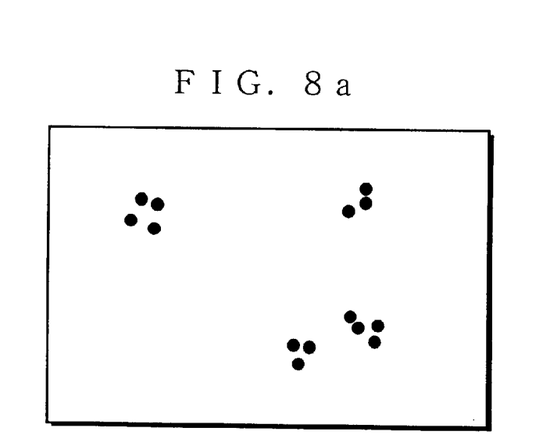
FIGS. 8a to 8c are diagrams in assistance of explaining the concept of clustering processing carried out in steps S23 and S24 in FIG. 7.
Figure 8B:
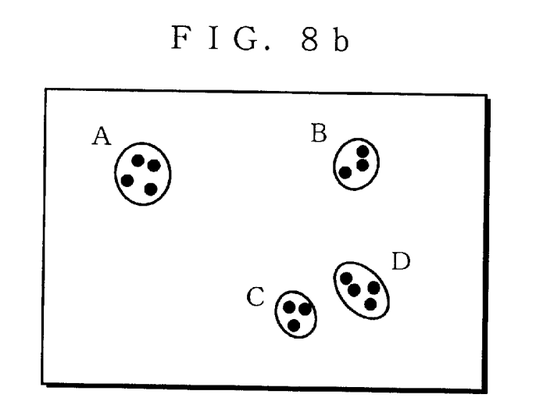
Figure 8C:
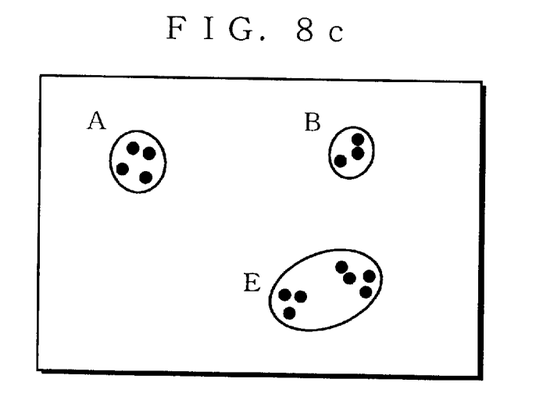

Here, with reference to FIGS. 8a to 8c, the clustering carried out in steps S23 and S24 is briefly described.

Assuming herein is that a case where components exceeding the threshold value G in voting value (dots in the drawings) are distributed as in FIG. 8a. Cluster evaluation performed in such case by the analysis part 5 is as follows. In the initial clustering, exemplarily as in FIG. 8b, four initial clusters of A, B, C, and D are generated. Once those initial clusters were generated, then similarity is calculated for every pair of clusters. If the calculated similarity is equal to or larger than a predetermined threshold value, the applicable pair of clusters are combined. In FIG. 8c, exemplarily, the clusters C and D are combined, and becomes a cluster E. Thereafter, the clusters A, B, and E are calculated for a variance value, and the like, for evaluation. Herein, since the cluster A and B are both small in variance value, center points thereof are both considered a center of the face. The cluster E large in variance value is not considered a center of the face.

In the case that two or more clusters are detected by evaluation made based on the variance value, for example, determination of a face region may be done as follows:

First, if the detected clusters share a center point and varied in size, a face region is the cluster whose variance value is minimum;

Second, if the detected clusters do not share a center point and varied in size, all of those are face regions each differed in position and size; and Third, if the detected clusters do not share a center point but identical in size, all of those are face regions differed in position but same in size.

Figure 9A:
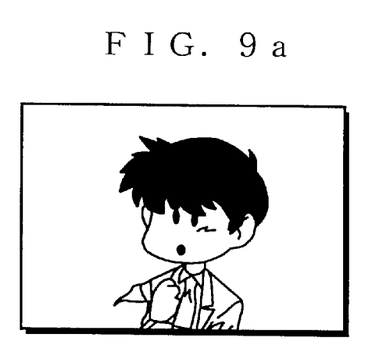
FIGS. 9a to 9c are diagrams showing an exemplary image edit processing carried out by an image editing part 6.
Figure 9B:
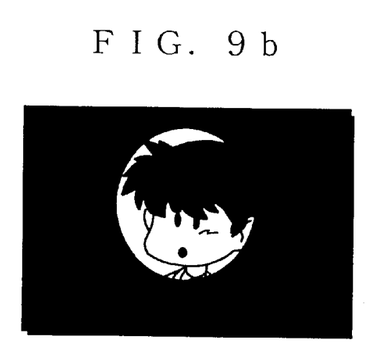
Figure 9C:
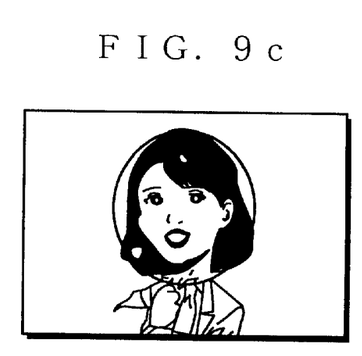

The image editing part 6 receives the analysis results (face regions) from the analysis part 5, and responds to any request for image processing with respect to the target image. Utilized herein is a face region being distinguishable from the rest by the analysis results. For example, the image editing part 6 clips or solidly shades the target image of FIG. 9a, leaving only a face region (FIG. 9b). Accordingly, generated thereby is an image having only a face emphasized. Alternatively, the image of the face region of FIG. 9a can be replaced with another (e.g., image of other character's face) as shown in FIG. 9c. In this manner, the face can be intentionally concealed.

Note that, the image editing part 6 is appropriately provided to meet a need for image processing utilizing the extracted face region, but is not essential for the face image extraction device of the present invention.

As is known from the above, according to the face image extraction device and method of the present embodiment, face position can be detected at high speed only with light-loaded voting processing (basically, only addition) and evaluation of voting values. Further, as is utilizing a template composed of concentric shapes varied in size, approximation can be done in a practical manner by comparing, in size, an edge part presumed to be a face region with the template. Accordingly, size of the face can be detected also at high speed. As such, in the face image extraction device of the present invention, processing load can be considerably reduced, thereby achieving almost real-time face region extraction even with the processing capabilities available for the existing personal computers.

Further, with the face image extraction device of the present invention, a face region does not have to be defined where and how many in a target image prior to extraction, and thus a face can be detected no matter what size and type the target image is. Accordingly, applicability of the device is considered quite wide. Moreover, even in the case that the target image includes several faces, the face region can be extracted by clustering the voting results and then correctly evaluating correlation thereamong.

Typically, the face image extraction device of the above embodiment is functionally (face image extraction method) implemented by a storage having a predetermined program stored therein (e.g., ROM, RAM, hard disk) and a CPU (Central Processing Unit) carrying out the program. Here, the program may be provided by a recording medium such as CD-ROM or floppy disk. The program may be partially recorded in a plurality of recording media for distribution.

It is herein assumed that a part of the program is functionally put on various processes or threads (e.g., DLL) no matter whether the program being a part of operating system or not. In such case, even if not storing the part of the program, the recording medium is regarded as the one having recorded the program for carrying out the face image extraction method of the present invention.

Moreover, described in the foregoing is the exemplary case that the face image extraction method of the present invention is implemented by a stand-alone type (FIG. 1), but this is not restrictive and may be implemented by a server-client type. In other words, in addition to the stand-alone type having only one terminal functionally carry out the face image extraction method, the server-client type will also do. Therein, the face image extraction method is partially or entirely carried out functionally by a server or a device on a network connectable to a terminal being a client. For example, the server may be the one functionally carrying out the method, and the client has only a WWW browser. In such case, information (e.g., template, voting values) is normally on the server, and is distributed to the client basically over the network. When the information is on the server, a storage in the server is equivalent to the "recording medium", and when on the client, a storage in the client is equivalent thereto.

Further, the program carrying out the face image extraction method of the present invention may be an application written in machine language after compilation, or an intermediate code interpreted by the above process or thread. Or, in a "recording medium", at least resource and source codes are stored together with a compiler and a linker, which can generate an application written in machine language by utilizing such codes. Or, in a "recording medium", at least the resource and source codes are stored together with an interpreter, which can generate an application in the intermediate code by utilizing such codes.

While the invention has been described in detail, the foregoing description is in all aspects illustrative and not restrictive. It is understood that numerous other modifications and variations can be devised without departing from the scope of the invention.

What is claimed is:

1. A face image extraction device for defining a face in a target image by position and size for extraction, comprising:

an edge extraction part for extracting an edge part (pixels outlining a person or face) from said target image, and generating an image having only the edge part (hereinafter, edge image);

a template storage part for storing a template composed of a plurality of predetermined concentric shapes equal in shape but varied in size;

a voting result storage part for storing, in a interrelating manner, voting values and coordinates of pixels on said edge image for every size of the concentric shapes of said template;

a voting part for increasing or decreasing said voting values of every pixel, specified by the coordinates, outlining each of said concentric shapes every time a center point of said template moves on the pixels in said edge part; and an analysis part for defining the face in said target image by position and size based on said voting values stored in said voting result storage part.

2. The face image extraction device according to claim 1, wherein said predetermined concentric shape is a circle.

3. The face image extraction device according to claim 1, wherein said predetermined concentric shape is an ellipse.

4. The face image extraction device according to claim 1, wherein said predetermined concentric shape is a polygon.

5. The face image extraction device according to claim 1, wherein said edge extraction part extracts said edge part from said target image by using a filter for a high frequency component.

6. The face image extraction device according to claim 1, wherein, when said target image is structured by a plurality of successive images, said edge extraction part extracts said edge part by comparing a current image with another image temporally before, and with after to calculate a difference therebetween, respectively, for every image structuring said target image.

7. The face image extraction device according to claim 1, wherein said edge extraction part detects, with respect to pixels extracted in every predetermined box, one pixel located far-left end or far-right end in the box on a scanning line basis, and regards only the pixels detected thereby as said edge part.

8. The face image extraction device according to claim 1, wherein said analysis part performs clustering with respect to said voting values stored in each of said voting result storage parts, and narrows down position and size of the face in said target image.

9. The face image extraction device according to claim 1, further comprising an image editing part for editing said target image in a predetermined manner by distinguishing a face region defined by position and size in said analysis part from the rest in the target image.

10. The face image extraction device according to claim 1, further comprising an image editing part for replacing an image of the face region defined by position and size by said analysis part with another.

11. A face image extraction method for defining a face in a target image by position and size for extraction, comprising:

an extraction step of extracting an edge part (pixels outlining a person or face) from said target image, and generating an image having only the edge part (hereinafter, edge image);

a first storage step of storing a template composed of a plurality of predetermined concentric shapes equal in shape but varied in size;

a second storage step of storing, in a interrelating manner, voting values and coordinates of pixels on said edge image for every size of the concentric shapes of said template;

a voting step of increasing or decreasing said voting values of every pixel, specified by the coordinates, outlining each of said concentric shapes every time a center point of said template moves on the pixels in said edge part; and an analysis step of defining, after said voting step, the face in said target image by position and size based on said voting values.

12. The face image extraction method according to claim 11, wherein said predetermined concentric shape is a circle.

13. The face image extraction method according to claim 11, wherein said predetermined concentric shape is an ellipse.

14. The face image extraction method according to claim 11, wherein said predetermined concentric shape is a polygon.

15. The face image extraction device according to claim 11, wherein, in said extraction step, said edge part is extracted from said target image by using a filter for a high frequency component.

16. The face image extraction method according to claim 11, wherein, in said extraction step, when said target image is structured by a plurality of successive images, said edge part is extracted by comparing a current image with another image temporally before, and with after to calculate a difference therebetween, respectively, for every image structuring said target image.

17. The face image extraction method according to claim 11, wherein, in said extraction step, with respect to pixels extracted in every predetermined box, one pixel located far-left end or far-right end in the box is detected on a scanning line basis, and only the pixels detected thereby is regarded as said edge part.

18. The face image extraction method according to claim 11, wherein, in said analysis step, clustering is performed with respect to said voting values stored in each of said voting result storage parts, and position and size of the face is narrowed down in said target image.

19. A recording medium having recorded a face image extraction method for defining a face in a target image by position and size as a program executable on a computer device, the program at least comprising:

a extraction step of extracting an edge part (pixels outlining a person or face) from said target image, and generating an image having only the edge part (hereinafter, edge image);

a first storage step of storing a template composed of a plurality of predetermined concentric shapes equal in shape but varied in size;

a second storage part of storing, in a interrelating manner, voting values and coordinates of pixels on said edge image for every size of the concentric shapes of said template;

a voting step of increasing or decreasing said voting values of every pixel outlining each of said concentric shapes every time a center point of said template moves on the pixel in said edge part; and an analysis step of defining, after said voting step, the face in said target image by position and size based on said voting values.

* * * * *